United States Patent [19]
Furuya et al.

[11] Patent Number: 5,181,012
[45] Date of Patent: Jan. 19, 1993

[54] DISPLAY APPARATUS FOR AUTOMOBILES

[75] Inventors: Yoshiyuki Furuya; Tadashi Iino; Kunimitsu Aoki, all of Shizuoka, Japan

[73] Assignee: Yazaki Corporation, Tokyo, Japan

[21] Appl. No.: 763,728

[22] Filed: Sep. 23, 1991

[30] Foreign Application Priority Data

Sep. 27, 1990 [JP] Japan .............................. 2-101965[U]

[51] Int. Cl.⁵ .............................................. B60Q 1/00
[52] U.S. Cl. .................................... 340/461; 340/705; 340/980; 359/630
[58] Field of Search ............... 340/461, 980, 705, 438; 358/103; 359/630, 609, 613, 614; 353/13, 14

[56] References Cited

U.S. PATENT DOCUMENTS

| | | | |
|---|---|---|---|
| 2,162,791 | 6/1939 | Shreve | 359/609 |
| 2,622,137 | 12/1952 | Peter et al. | 359/609 |
| 3,984,157 | 10/1976 | LeVantine | 359/613 |
| 4,185,902 | 1/1980 | Plaot | 359/614 |
| 4,961,626 | 10/1990 | Fournier, Jr. et al. | 340/705 |
| 5,013,135 | 5/1991 | Yamamura | 340/980 |
| 5,070,323 | 12/1991 | Iino et al. | 340/705 |

FOREIGN PATENT DOCUMENTS

| | | | |
|---|---|---|---|
| 0415275 | 3/1991 | European Pat. Off. | 359/630 |
| 0052533 | 2/1989 | Japan | 340/438 |

Primary Examiner—Jin F. Ng
Assistant Examiner—Brent A. Swarthout
Attorney, Agent, or Firm—Nikaido, Marmelstein, Murray & Oram

[57] ABSTRACT

A display apparatus for automobiles which enhances the quality of the displayed image by a shading portion which prevents external light from being observed. A display apparatus for automobiles according to the present invention includes an indicator, a reflection member having a reflection surface which opposes a display surface of the indicator and a light transmissible reflection member arranged between the indicator and the reflection member. The light transmissible reflecting member transmits display light of the indicator and reflects reflected light from the reflection member to a driver's side. A meter hood extends to the driver's side of the reflection member. A shading portion extends below the reflection surface of the reflection member on the meter hood side of the reflection member.

6 Claims, 5 Drawing Sheets

DISPLAY APPARATUS FOR AUTOMOBILES

BACKGROUND OF THE INVENTION

1. Field of the Invention

The present invention relates to a display apparatus for automobiles which is installed at an instrument panel for indicating information on driving conditions for a driver.

2. Description of the Prior Art

Conventionally, a display apparatus for automobiles is proposed, which utilizes reflection surfaces for displaying an image at a long distance to increase the speed for recognizing the displayed image.

In this display apparatus for automobiles, since a longer optical path after reflection shows a better far-point-display function, as described in FIG. 5, a display apparatus for automobiles has been proposed in which light is reflected by two surfaces so that the optical path of the reflected light is lengthened while reducing the space occupied by the reflected light.

In FIG. 5, denoted 21 is a self-emission-type indicator such as a liquid crystal display and a vacuum fluorescent tube, 22 a semi-transparent plate as a reflection plate with a reflection surface 22A formed of dark transparent acrylic smoked plate, 23 a total reflection mirror with a total reflection surface 23A opposing the semi-transparent reflection plate 22, and 24 a meter hood integrally formed with an instrument panel. The indicator 21, the semi-transparent reflection plate 22, and the total reflection mirror 23 are installed in the instrument panel. The semi-transparent reflection plate 22 is diagonally arranged in such a manner as to have an angle between the plate and the total reflection mirror 23 smaller than 45°.

A dashed line in the figure represents a ray which is emitted from the indicator 21 and finally reaches the viewfield 25. A display light projected by the indicator 21 transmits through semi-transparent reflection plate 22 and falls on the total reflection mirror 23 to be reflected by the total reflection mirror 23. Then, the light is further reflected by the reflection surface 22A of the semi-transparent reflection plate 22 to be directed to the viewfield 25. Therefore, when seen from the viewfield 25, behind the reflection surface 22A of the semi-transparent reflection plate 22 is recognized a virtual image of the display.

In this case, the recognized virtual image is positioned in the range that the display light is reflected by the reflection surface 23A of the total reflection mirror 23 via the reflection surface 22A to reach the viewfield and the virtual image is displayed at a long distance by repeated reflection so that a clear displayed image is obtained. Further, the semi-transparent reflection plate is darkish and the reflection surface 22A thereof is not a total reflection surface, allowing a displayed image to be recognized on the dark background.

The meter hood 24 interrupts external light S from an upside like an ordinary meter hood and prevents the display by the reflected light within the range B from washout. The range B (hereinafter called as "display range") is defined as the range that the reflection surface 23A is seen from the viewpoint 25 via the reflection surface 22A.

However, in the display apparatus described above having two reflection surfaces 22A and 23A, as exemplified in FIG. 5a line of sight passing through the upper optical path in the range that the display range B is seen from the viewfield 25 is directed to an optical path Q on the driver's side since the line of sight is repeatedly reflected by the reflection surfaces 22A and 23A. Accordingly, external light may be seen on the background because a view on the driver's side is recognized, causing a problem that the quality of the displayed image is deteriorated.

SUMMARY OF THE INVENTION

It is therefore an object of the present invention to enhance the quality of the displayed image, which is displayed at a long distance by the display apparatus for automobiles having two reflection surfaces described above in which the background is colored darkish to prevent external light from being seen.

A display apparatus for automobiles according to the present invention comprising: an indicator; a reflection member having a reflection surface which opposes a display surface of the indicator; a light transmissible reflection member arranged between the indicator and the reflection member for transmitting display light of the indicator and reflecting reflected light from the reflection member to a driver's side; a meter hood extending to the driver's side of the reflection member; and a shading portion extending below the reflection surface of the reflection member on the meter hood side of the reflection member.

In the display apparatus for automobiles according to the present invention, when the reflection surface of the reflection member is observed from the driver's seat via the reflection surface of the light transmissible reflection member, line of sight is reflected by the reflection surface of the light transmissible reflection member and is directed to the lower surface of the meter hood, the shading portion, and the reflection member. Further, some of the line of sight, which are directed to the reflection member, are reflected by the reflection member to be directed to the shading portion.

Therefore, from the driver's side, only the lower surface of the meter hood and the shading portion are observed so that the background of the display becomes dark without external light being recognized.

BRIEF DESCRIPTION OF THE DRAWINGS

The present invention will be more apparent from the ensuing description with reference to the accompanying drawing wherein.

DETAILED DESCRIPTION OF PREFERRED EMBODIMENTS

Figure 1:
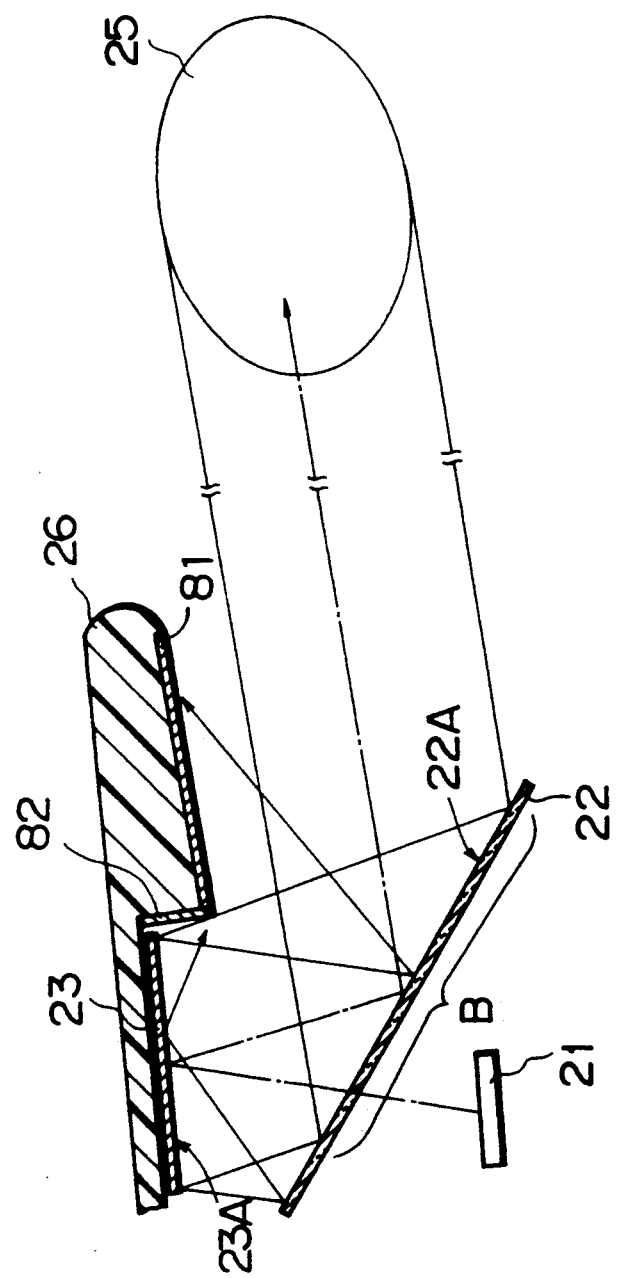
FIG. 1 shows a display apparatus for automobiles according to a first embodiment of the present invention.
Figure 5:
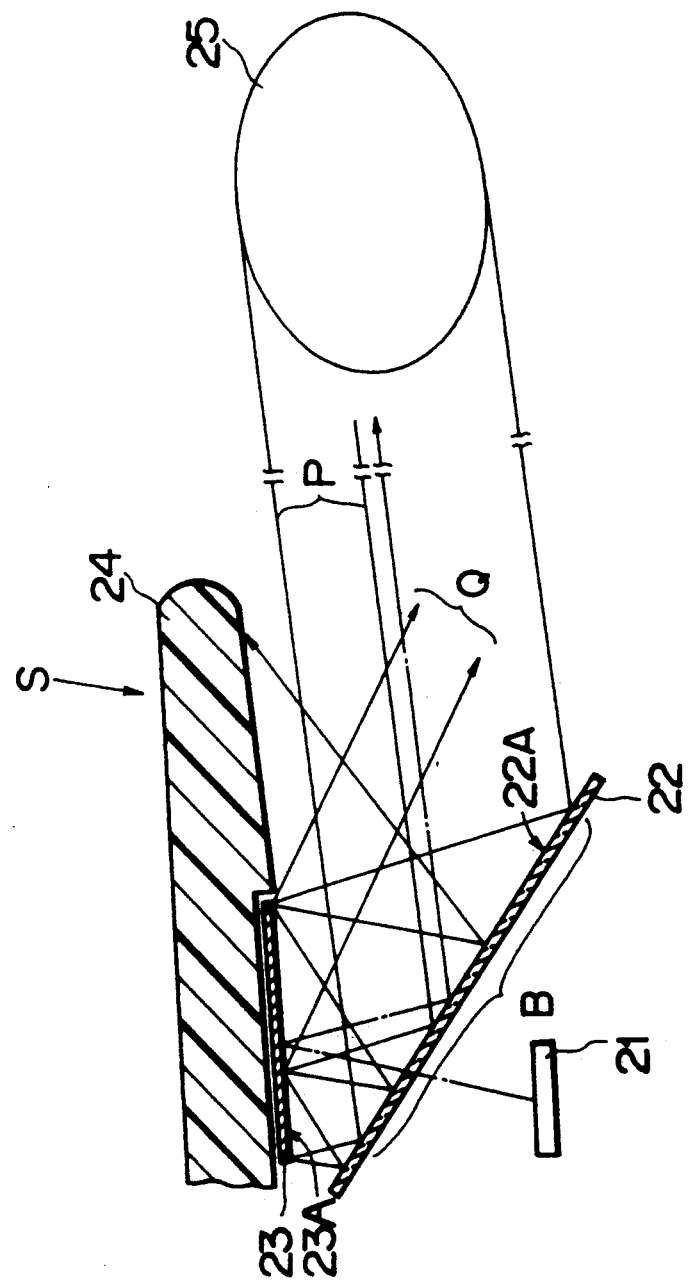
FIG. 5 shows a conventional display apparatus for automobiles utilizing two reflection surfaces to display an image at a long distance.

FIG. 1 shows a display apparatus for automobiles according to a first embodiment of the present invention and the portions similar to those of FIG. 5 are described with the same reference numerals. Similar to the embodiment shown in FIG. 5, display light (light shown by a dashed line) from an indicator 21 is reflected by a total reflection mirror 23 after transmitting from a display apparatus for automobiles 22 and is further directed to a driver's viewpoint by the semi-transparent reflection plate 22. Then, a virtual image of the display is recognized behind a reflection surface 22A of the semi-transparent reflection plate 22 when the reflection surface is observed.

In the figure, denoted 26 is a meter hood which is integrally formed with an instrument panel. A total reflection mirror 23 is installed in a concave portion formed at the root of the meter hood 26. Then, on the lower surface of the meter hood 26 is provided a first shading plate 81 and on a shoulder formed by the shading plate 81 and the total reflection mirror 23 is provided a second shading plate (shading portion) 82. The first and second shading plates 81 and 82 each has been treated with a nonreflection treatment on the surface thereof to absorb light on a black surface.

The height of the shading plate 82 and the position of the total reflection mirror 23 are determined in such a manner that light, passing through the upper end of a display range B within the upper end of the viewfield 25, is reflected by an end of the total reflection mirror 23 and the semi-transparent reflection plate 22 and is further reflected by the total reflection mirror 23 again to be directed to the second shading plate 82.

Meanwhile, light passing through the lower end of the display range B within the lower end of the viewfield 25 is reflected by an end of the total reflection mirror 23 to be directed to the first shading plate 81.

Therefore, when the display range B is seen from the viewfield 25, the shading plates 81 and 82 are always recognized by a dark background.

Figure 2:
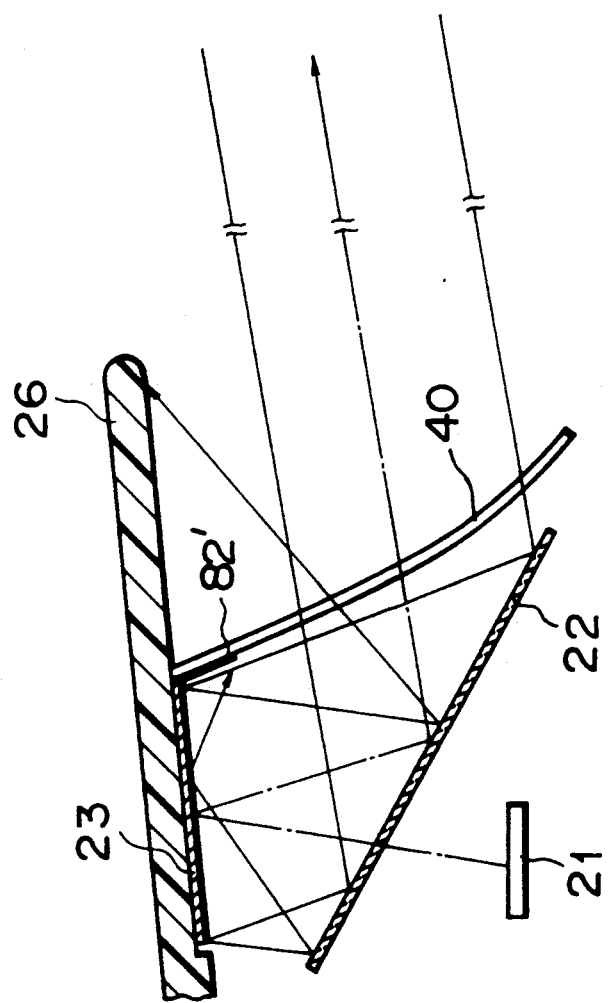
FIG. 2 shows a display apparatus for automobiles according to a second embodiment of the present invention.
Figure 3:
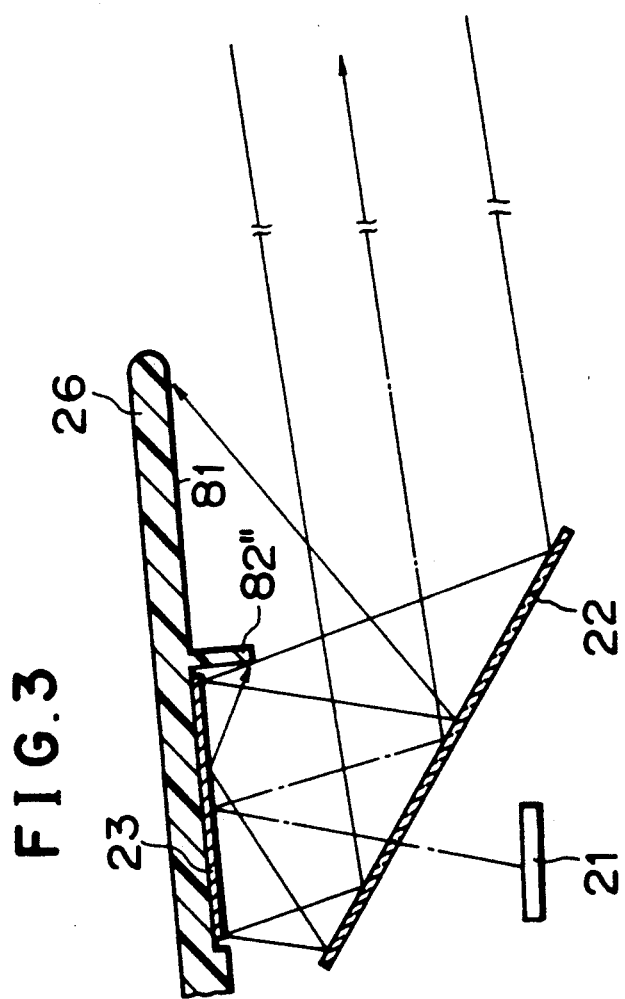
FIG. 3 shows a display apparatus for automobiles according to a third embodiment of the present invention.

FIG. 2 shows a second embodiment of the present invention and FIG. 3 shows a third embodiment of the present invention. The portions similar to those of FIG. 1 are described with the same reference numerals.

The display apparatus for automobiles described in FIG. 2 is provided with a transparent front cover 40 extending below the meter hood from an end thereof, and at an end of the front cover 40 on the total reflection mirror 23 side of the meter hood 26 is formed a shading layer 82' by painting the front cover a dark color. This shading layer 82' has the same effect as the shading plate 82 described above.

The display apparatus for automobiles shown in FIG. 3 is provided with a shading plate 82" standing on an end of the total reflection mirror 23 on the meter hood side 26, and the shading plate 82" also has the same effect as the shading plate 82.

Figure 4:
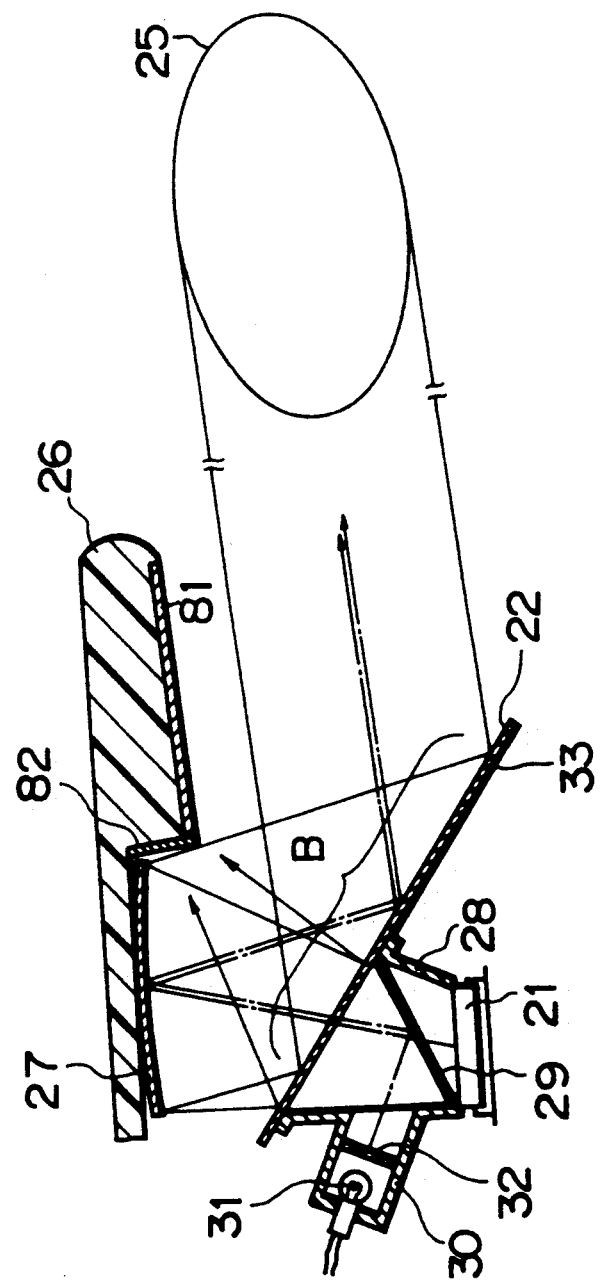
FIG. 4 shows a display apparatus for automobiles according to a fourth embodiment of the present invention.

FIG. 4 shows a display apparatus for automobiles according to a fourth embodiment of the present invention and the portions similar to those of FIG. 1 are described with the same reference numerals.

In the figure, denoted 27 is a total reflection mirror 27 having a shape of spherical concave, 28 a case body having a shape of a hollow pillar for enclosing the circumference of the indicator 21 and a part of the rear surface of the semi-transparent reflection plate 22. A transmissible reflection plate 29 is arranged between the semi-transparent reflection plate 22 and the indicator 21 in the case body 28. An alarm indicating portion 30 is formed on the side of the case body 28. A black treatment layer 33 is formed on the rear surface of the semi-transparent reflection plate 22.

At the alarm indicating portion 30 is provided a filter lens on which an alarm symbol is printed on a reflection plate 29 side of a bulb 31. When the bulb 31 is turned on, an alarm display image is recognized through the filter lens 32. The alarm display image is reflected by the reflection plate 29 to be directed to the semi-transparent reflection plate 22. Then, the light from the alarm display image is directed to the viewfield 25 after passing through the same optical path as that of the display light of the indicator 21, permitting the alarm display image, besides the display by the indicator 21, to be multiply displayed.

Further, the curvature of the concave surface of the total reflection mirror 27 is determined so that the indicator 21 and the filter lens 32 are positioned within an optical focus, and the displayed image of the indicator 21 and the alarm display image are displayed at a long distance with enlarged images.

In this embodiment, light passing through the display range B from the viewfield 25 is converged when reflected by the total reflecting mirror 27. However, when the light is reflected by the semi-transparent reflection plate 22, it is directed to the first and second shading plates 81 and 82.

Therefore, when the display range is seen from the viewfield 25, the shading plates 81 and 82 are always recognized by a dark background.

Further, the quality of the display is more preferably improved by eliminating diffused reflection in the case body 28 with covering a surface thereof with hair-like material and black ink painting to improve the condition of the dark background.

In the embodiment described above, multiple display is carried out by installing the alarm display portion 30. However, only the indicator 21 may be used to display the image without the alarm display portion 30 like the first embodiment.

As described above, in the display apparatus for automobiles according to the present invention in which a displayed image of a self-emission-type indicator is transmitted by a light transmissible reflection member so as to be reflected by a reflection member to the light transmissible reflection member side, and is further reflected on the driver's seat side through the area under the meter hood by the light transmissible reflection member, since a shading portion is provided so as to extend below the reflection surface of the reflection member, and a line of sight when the display surface of the reflection member is seen from the driver's seat via the reflection surface of the light transmissible reflection member is directed to the lower surface of the meter hood and the shading portion, only the lower surface of the meter hood and the shading portion are recognized when seen from the driver's seat, which improves the quality of the display with dark background without external light being recognized.

What is claimed is:

1. A display apparatus for automobiles comprising:
   an indicator;
   a reflection member having a reflection surface which opposes a display surface of said indicator;
   a light transmissible reflection member arranged between said indicator and said reflection member for transmitting display light of said indicator and for reflecting reflected light from said reflection member to a visual field;

a meter hood extending from a dashboard toward a visual field side of said light transmissible reflection member, said reflection member located within said meter hood; and a shading means, connected to said meter hood and extending below said reflection surface of said reflection member which is located on said meter hood, for preventing external light from being reflected from end portions of said light transmissible reflection member into said visual field.

2. A display apparatus for automobiles as claimed in claim 1, wherein said shading means includes a black reflection plate.

3. A display apparatus for automobiles as claimed in claim 1, wherein said shading means includes a dark shading layer formed at one end of a transparent front cover provided on said meter hood, said transparent front cover being formed at one end of said reflection member projecting from said meter hood.

4. A display apparatus for automobiles as claimed in claim 1, wherein said reflection member includes a total reflection mirror with a concave surface for displaying an enlarged displayed image of said indicator.

5. A display apparatus for automobiles as claimed in claim 1 further comprising:

a case body having a shape of a hollow pillar for enclosing a circumference of said indicator and a part of a surface of said light transmissible reflection member;

a transmissible reflection plate arranged between said light transmissible reflection member and said indicator in said case body; and an alarm indicating portion formed on a side of said case body, said alarm indicating portion comprising a bulb and a filter lens on which an alarm symbol is printed, wherein when said bulb is turned on, said alarm symbol and a displayed image of said indicator are multiply displayed.

6. A display apparatus for automobiles as claimed in claim 5, wherein inner surfaces of said case body are covered with a hair-like material for eliminating diffused reflection in said case body.

* * * * *